March 28, 1950
J. A. BALL
2,502,306
SHRINKAGE COMPENSATION LENS-POSITIONING
DEVICE FOR OPTICAL PRINTERS
Filed Nov. 6, 1948
2 Sheets-Sheet 1
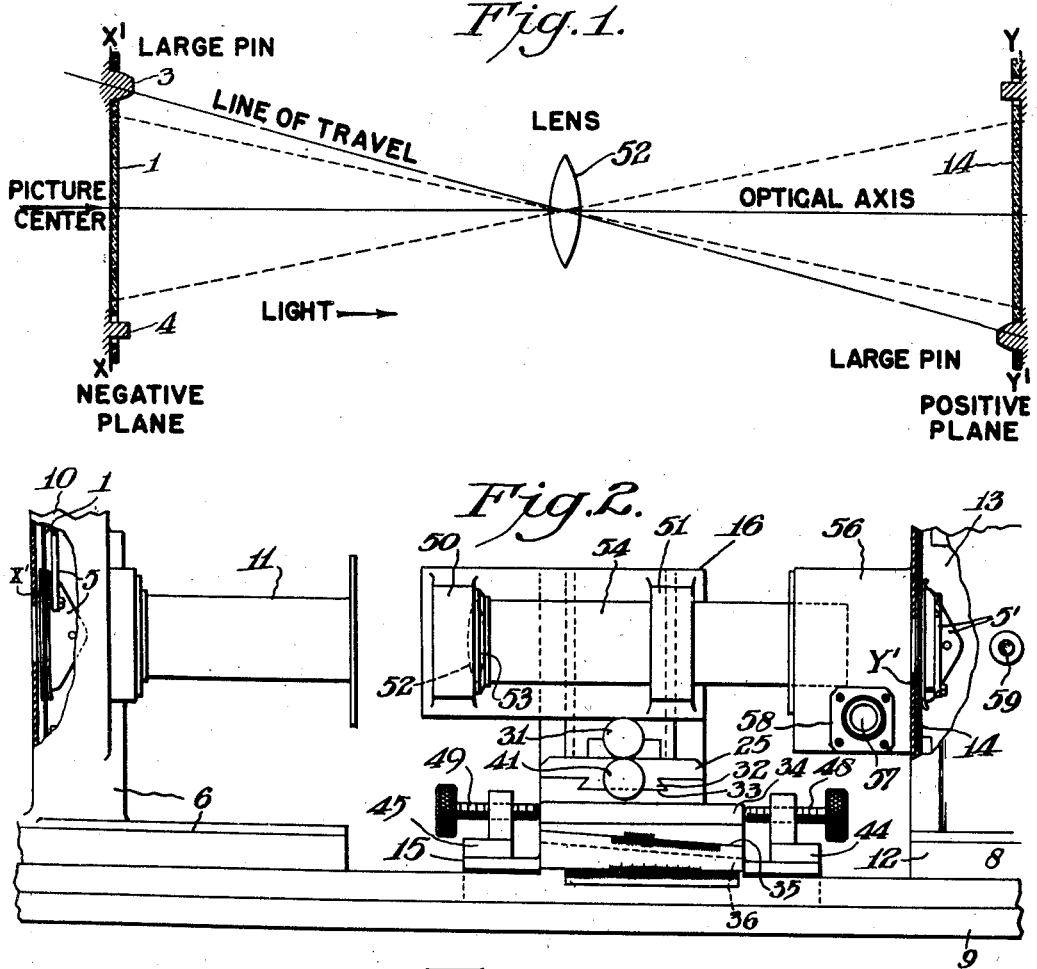
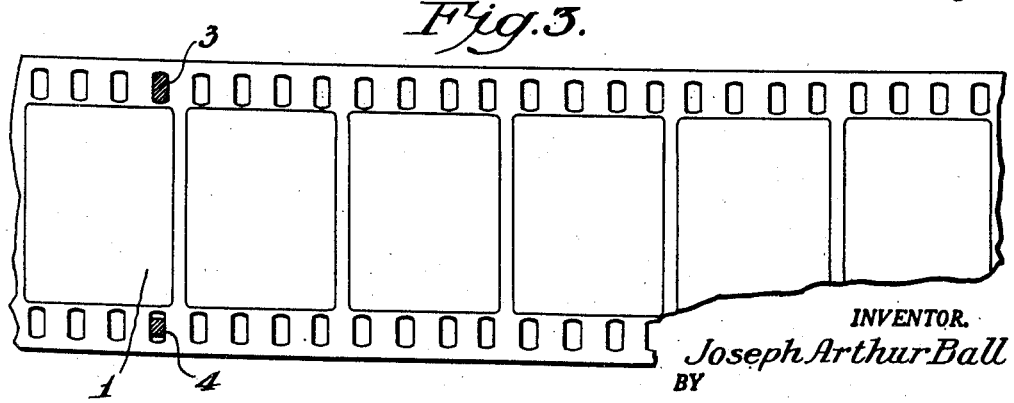
INVENTOR.
Joseph Arthur Ball
BY
Lynn Barratt Morris
ATTORNEY March 28, 1950

J. A. BALL 2,502,306

SHRINKAGE COMPENSATION LENS-POSITIONING DEVICE FOR OPTICAL PRINTERS

Filed Nov. 6, 1948

INVENTOR.
Joseph Arthur Ball
BY
Lynn Barrett Morris
ATTORNEY

Patented Mar. 28, 1950

2,502,306

UNITED STATES PATENT OFFICE 2,502,306

SHRINKAGE COMPENSATION LENS-POSITIONING DEVICE FOR OPTICAL PRINTERS

Joseph Arthur Ball, Los Angeles, Calif., assignor to E. I. du Pont de Nemours & Company, Wilmington, Del., a corporation of Delaware Application November 6, 1948, Serial No. 58,692

3 Claims. (Cl. 88—24)

This invention relates to photography and, more particularly, to an optical printing device. Still more particularly, it relates to an improved shrinkage compensation optical printing device for copying photographic images from cinematographic film.

Optical printing devices are used to print photographic images from an image bearing photographic element onto another photographic element which is light-sensitive. The two elements are not in contact, hence proper registration is obtained by an optical system and a correlated mechanical system. Such systems are useful when it is desired to print through the base of the film and/or onto wet films or to enlarge or reduce images in printing. Film base expands when wet and shrinks when dry. For this reason it is difficult to obtain accurate prints in optical printers.

An object of this invention is to provide an improved optical printing device. A further object is to provide such a device whereby isotropic shrinkage or expansion of the film base of the printing element can be readily compensated. A still further object is to provide such a device wherein the optical compensation can be made by a simple adjustment. Still other objects will be apparent from the following description.

The nature of the invention will be readily understood by an explanation of (1) the manner in which images on a cine film are distorted by expansion or shrinkage of the film base and (2) the conventional optical system of an optical copying printing device.

It is customary in the printing of images, e. g., color separation negatives, to position or register a cine film at the so-called camera or projection aperture and to position the positive film to be printed on at the printing aperture by fitting a pair of sprocket holes onto a pair of register pins. Of these two pins, one is full-fitting and the other is reduced in the dimension which runs crosswise of the film. In effect, these two pins determine a co-ordinate system. The center of the full-fitting pin determines an axis perpendicular to the plane of the film, and the intersection of this axis with that plane determines a fixed point. The other pin serves to determine a rotation about this fixed point. In this manner a co-ordinate system in the plane of the film is established and can be reproduced at any desired time. Any point in an image on a cine film can be located precisely by determining its two co-ordinates, (1) the distance from the center of the big pin measuring across the film and (2) the distance from the line joining the centers of the two pins.

Consider now what happens when the film expands or shrinks isotropically. It is clear that the two distances above-mentioned will change proportionally. This means a given point in the image will during expansion or contraction move along a line which passes through the origin of the co-ordinates; in other words, through the center of the big pin or through the center of the perforation which engages the big pin. The usual arrangement is illustrated in Fig. 3 of the accompanying drawing which constitutes a part of the present specification. This figure shows a short length of film with perforations and a picture image on the register pins. In this figure is also shown a full-fitting pin in one perforation and a narrow pin fitting the companion perforation across the film. The perforations as shown are in the normal relationship to the indicated picture.

The optical printing device of this invention will now be described with reference to the drawing wherein the same reference numerals refer to the same parts throughout the several views.

Fig. 1 is a schematic plan view of the optical system of the printer;

Fig. 2 is a front elevation of the optical printer and lens adjusting device;

Fig. 3 is a view in elevation of motion picture film on the register pins;

Referring now to Fig. 1, the line X—X' lies in the plane of the picture in the negative film. Light rays which are shown in dotted lines converge in the lens and radiate to the positive film which has its sensitive surface in the positive plane Y—Y'. The image in the plane Y—Y' should be approximately the same in size as the object in the plane X—X' and, therefore, the two are equally distant from the lens. The overall length from the plane of the negative picture to the sensitive surface of the film to be printed on is four times the focal length of the lens plus whatever allowance is made for the thickness of the lens.

In the system just described a slight motion along the optical axis does not significantly affect focus but does affect the degree of magnification. If the lens is assumed first to be in exactly that position which will make image and object (negative picture) the same in size, then a slight motion of lens along the optical axis in one direction will result in a small magnification, and motion of the lens in the opposite direction will result in a slight reduction (or demagnification), all without any effect upon focus.

It has been discovered that if the lens is not only made adjustable along the optical axis and at right angles thereto in a horizontal and vertical direction but is also made adjustable along the skewed axis joining the center of the two full-fitting pins as shown in Fig. 1 that the resultant change in the image at line Y—Y' is of exactly the same nature as that which occurs in isotropic shrinkage or expansion of the film. Therefore, by a simple adjustment of the lens along the "line of travel" skewed axis, one can rapidly adjust the size relationships of object and image to compensate for shrinkage of the film. The entire adjustment takes place within the normal focal range of the lens system and enlargement or reduction is attained without producing an out-of-focus effect.

The motion of the lens along the skewed axis can be considered as equivalent to a motion along the optical axis and a simultaneous shift in the two directions horizontally and vertically perpendicular to the optical axis so as to restore the location of the center of co-ordinates. The correct combination of the motions is, however, automatically accomplished by providing for accurate adjustment along the skewed axis.

Figure 4:
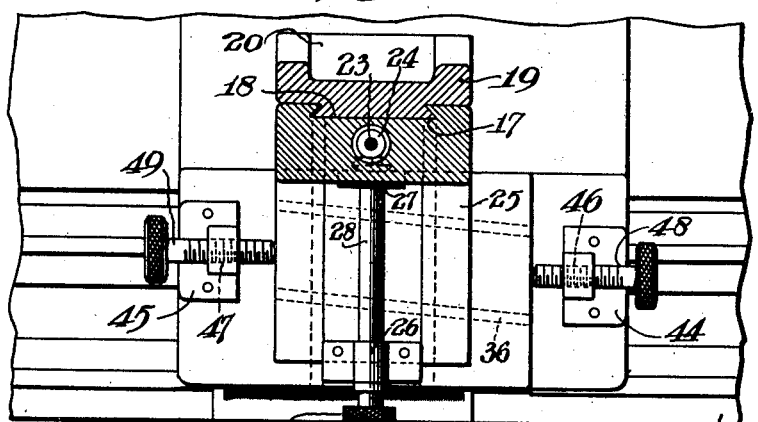
Fig. 4 is a plan view of the lens adjusting device.
Figure 5:
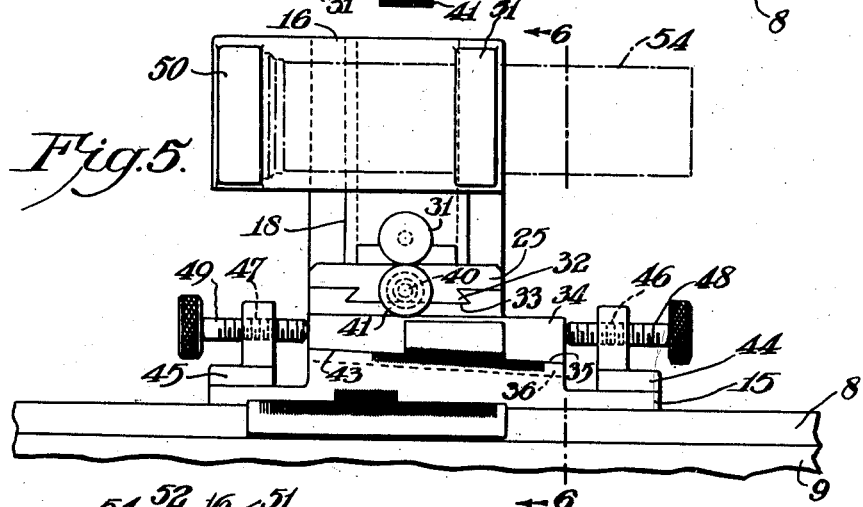
Fig. 5 is an elevation of the lens adjusting device.
Figure 6:
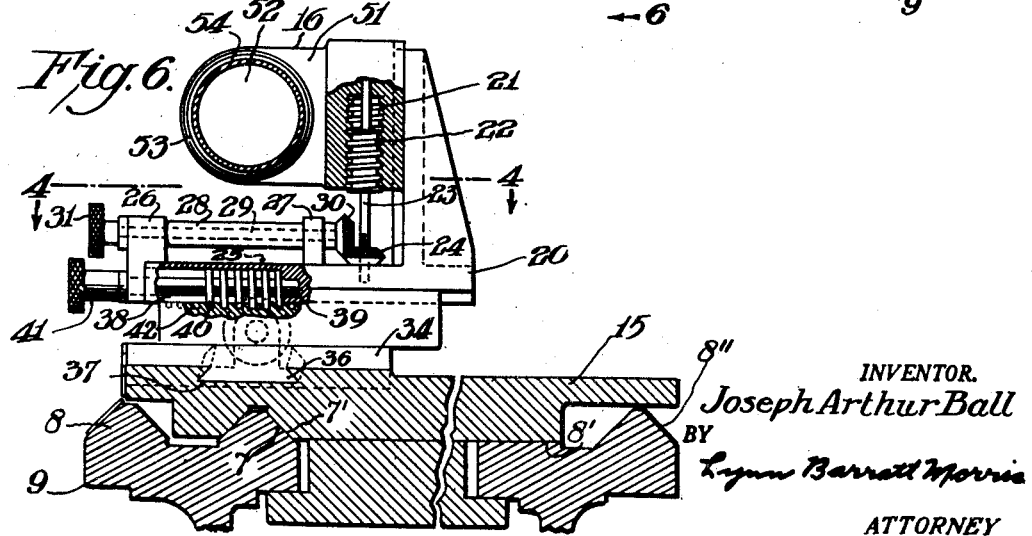
Fig. 6 is a side elevation of the lens adjusting device mounted on the supporting bed.

An apparatus suitable for adjusting the lens is shown in Figs. 2, 4, 5, and 6 of the drawing. A negative film 1 is mounted on registration pins 3 and 4 as shown in Figs. 1 and 2. A mechanism 5 for shifting the film, picture frame by picture frame, is mounted in housing 6 which contains the picture-bearing film guiding and operating mechanism. The details of the mechanism are not included here for the sake of simplicity. Suitable mechanisms, however, are common in cameras and optical printing devices. A practical mechanism is shown in Figs. 4 and 5 of Ball application Serial Number 45,885 filed August 24, 1948 and in Howell U. S. P. 1,038,586.

The base of housing 6 may be slidably mounted on carefully machined ways 7 or 8 and 8' or 8'' of frame 9. These ways and bed are similar to those used on a lathe. A source of light is provided in the housing and to the left of the orifice leading into chamber 10 behind the negative film 1. A shroud tube 11 is placed in front of the aperture in the mechanism for shifting the frame in order to confine the rays of light emerging from the film element. A second housing 12 which contains the film guiding and operating mechanism for the light-sensitive film is slidably mounted on the ways of the bed member in a manner similar to housing 6. The housing 12 has a light-proofed chamber 13 which encloses a mechanism 5' for guiding and advancing a length of light-sensitive cine film 14. The latter cine film during exposure is mounted on registration pins similar to those for the image or picture-bearing film. These pins are part of a suitable mechanism 5' for shifting the film, picture frame by picture frame. The mechanisms for shifting the positive and negative film are driven from a common source, e. g., a gear box, so that they are synchronized and as the picture-bearing film is shifted frame by frame, the light-sensitive film is shifted in like manner.

Suitable reels, driving sprockets, and guiding spools for the negative and positive film elements are disposed in chambers 10 and 13 or associated with housings 6 and 12 as is common in cameras, projectors, and printing mechanism. They form no part of the present invention and for the sake of simplicity, are eliminated.

The novel lens adjusting device of this invention is mounted between housings 6 and 12 and chambers 10 and 13 for the picture-bearing and light-sensitive films, respectively. The lens-adjusting device consists of a movable bed 15 which interfits with the machined ways of frame 9. To be more specific, the inner bottom surface of the movable bed 15 has a longitudinal V-shaped groove 7' which rides on V-shaped guideway 7 of the frame 9. The outer bottom surface has a machined flat surface which rides on flat guideway 8' of frame 9. The truncated surface of the guideway can be provided with teeth to form a rack, if desired whereby movement of bed 15 can be accomplished along the guideways.

The movable bed 15 carries a lens support 16 which is mounted on several co-operating members so that it is movable in three directions: (1) backward and forward along a horizontal axis which is perpendicular to the optical axis; (2) upward and downward on a vertical axis perpendicular to both the first axis and the optical axis; (3) sidewise along a skewed axis. The movable bed, as previously stated, is slidable along the guideways of the frame 9 whereby a rough adjustment of the device can be obtained.

The lens support has a body portion which contains a machined dovetail slot 17 which interfits with dovetail 18 of separate bracket arm 19 which constitutes a vertical arm of movable plate 20. The lens support 16 has a threaded socket 21 which coacts with screw 22 mounted on shaft 23 which is journaled in the upper end of the socket and in the base of movable plate 20. The lower end of the shaft is keyed to a gear 24 which is journaled on the surface of the horizontal portion 25 of plate 20.

Plate 20 has two spaced bearings 26 and 27 which can be fastened to the upper surface of the portion 25 by means of screws, welding, or the bearings may be integral with the plate. The bearings carry a bearing tube 28 in which there is journaled a shaft 29. The inner end of the shaft carries gear 30 which is riveted or keyed thereto or forms an integral extension of the end of shaft 29. The outer end of the shaft has attached thereto a knurled knob 31 whereby it and the gear can be turned, thus actuating gear 24 and screw 22 whereby the lens support can be moved upwardly or downwardly along the co-operating dovetails.

The lower surface of horizontal plate portion 25 has a dovetail projection 32 which interfits with a horizontal dovetail groove 33 on movable plate 34. The latter plate has a carefully machined bottom surface which is disposed at a slight angle from left to right as shown at 35. The central portion of this bottom plate has an obliquely disposed tongue 36 which slides in a dovetailed groove 37 in the upper face of movable bed 15. The dovetail tongue and groove slope upwardly at the same angle as the bottom of plate 34.

The horizontal arm 25 of bracket 20 has a socket 38 in its outer central portion which has a constricted portion at the inner end 39, and adjusting screw 40 is journaled in the socket, the non-threaded inner end being journaled in the recessed portion 39. The outer end of the adjusting screw has affixed thereto knurled knob 41. The threads in the adjusting screw engage with a threaded rack 42 in the central upper surface of the dovetailed groove 33. Upon turning the knurled knob 41, the screw coacts with the rack and moves bracket 20 and the lens mount carried thereby backward and forward.

The upper central portion of bed plate 15 is carefully machined at the same angle as the bottom of plate 34, as shown at 43. There are disposed on opposite sides of plate 34, brackets 44 and 45, the upper arms of which are threaded as shown at 46 and 47. Knurled screws 48 and 49 threadably engage the threads in brackets 44 and 45 whereby upon simultaneous adjustment of the screws in opposite directions, the base plate 34 and all of the members carried thereby including the lens mount can be adjusted along the skewed axis. The brackets 44 and 45 may be welded, bolted, or otherwise affixed to movable bed 15 or they may be integral with the latter plate.

The lens support has two spaced yokes 50 and 51 which carry the lens 52 and associated mounting 53 as well as the light-confining tube 54. This tube extends into a light-proofed chamber 56 adjacent to housing 13 which is disposed on the left of the light orifice, immediately adjacent to the light-sensitive film 14.

The mounting for lens 52 is shown diagrammatically. It may be of the type used in cameras and optical instruments. Thus, it may be threadedly engaged of tube 54 by means of co-operating threads on the lens mount and the inner surface of the tube. Suitable indicia can be placed on the tube to indicate the position of the lens.

A lens system for determining the correctness of the focus on film 14 is mounted within housings 56 and 13. Since it forms no part of the present invention and is common in projection printers, it is not shown except for eyepiece 57 and mount 58 and eyepiece 59.

The registration pins need not be at the upper and lower points of the respective frames at the apertures but can, for example, be at the center of the frames, if desired. Similarly, instead of the vertical and horizontal adjusting mechanisms, one can use shims between a bed and bearing surface.

The apparatus just described is useful in many printing operations for reproducing pictures or images in cine films. One practical printing operation will now be described in order to explain the operation of the device. Assume that at the left hand aperture there is placed on the registration pins a multi-color subtractive motion picture film transparency and it is desired to make a mask to be exposed by red light from that original transparency. If red light is allowed to pass through the transparency on the left, a red image record (e. g., a latent silver halide image) is formed in the emulsion layer of the light-sensitive film which is positioned on the registration pins on the right at the camera aperture. The lens adjustments prior to such exposure are made in advance so that there is exact unit magnification and so that the center of the co-ordinates at the left hand or camera aperture of the picture frame coincides with the center of the co-ordinates at the right or camera aperture immediately adjacent to the light-sensitive film element 14. The two co-ordinate systems at the respective apertures should be in a correct relationship to each other as regards rotation. Before printing the image from the original transparency and developing, fixing, washing and drying, etc., the masking film to be produced, the shrinkage to be expected from such operations is first determined. The lens is then shifted along the skewed axis by means of adjusting screws 48 and 49 in the direction and by an amount which will focus a slightly enlarged image on the light-sensitive film 14 in order to compensate for the shrinkage of the film. The amount of adjustment is directly proportioned to the degree of shrinkage. After processing, the resulting picture-bearing film will be of the correct size and location to be placed in face-to-face contact with the original transparency at the left hand printing aperture. The two films can then be run in face-to-face contact and printed onto another light-sensitive film element at the printing aperture.

While the apparatus described in the accompanying drawings shows a practical and preferred shrinkage compensation device for an optical printer, the invention is not limited to the particular construction shown. Thus, it is obvious that various minor modifications can be made without departing from the sipirit of the invention. Thus, the various parts can be in a single casting or machined part or made in two or more parts which can be fastened, bolted, welded or otherwise joined together.

Instead of having the adjusting screws 48 and 49 abut on the edges of movable bed 34, the ends of the screw may have a dovetailed, swiveled end connection which fits into a dovetailed slot in the plate. The mechanism shown, however, is satisfactory and is easy to assemble and adjust and therefore has the advantages of simplicity.

Similarly, instead of the co-operating threaded end screw mechanisms for adjusting the lens mount upwardly and downwardly, there may be used a rack and gear adjusting mechanism.

The apparatus is, of course, not limited to the particular use just described but may be used in a number of other manners for reproducing picture images. For example, in printing from old negatives onto positive film the long-term gradual shrinkage of the negative can be compensated for; in special effects printing where two different negatives are printed in superimposed fashion on the same positive with variations in size of the images; and, in processing of separation negatives for the preparation of color films, variations in shrinkage of the negatives can be overcome in printing.

What is claimed is:

1. In an optical printing device comprising a pair of register pins, one only of which is full-fitting for positioning a perforated film containing an image before an aperture, a second pair of register pins, one only of which is full-fitting for positioning a light-sensitive film at a spaced point to record said image and means for moving said films in synchronism, the combination of a lens mount which comprises a lens and means for moving said lens along an axis parallel to the line which joins the centers of the full-fitting register pins.

2. In an optical printing device for motion picture film comprising a pair of register pins, one only of which is full-fitting for positioning a frame of a perforated motion picture image-bearing film before a projection aperture, a second pair of register pins, one only of which is full-fitting for positioning a frame of light-sensitive perforated motion picture film before a printing aperture, the combination of a lens mount which comprises a lens which is movable along a vertical axis and along a horizontal axis and along an axis which passes through the center of the full-fitting register pins at the projection and printing apertures.

3. A shrinkage compensation lens positioning device for an optical printer having an upper pair of register pins, one only of which is full-fitting for positioning a picture frame in a length of perforated motion picture image-bearing film before a projection aperture, a second lower pair of register pins, one only of which is full-fitting for positioning a frame in a length of a light-sensitive perforated motion picture film before a printing aperture, which comprises a movable bed which is adjustable along a horizontal axis bearing a lens mount on a support which is adjustable along a horizontal axis and a vertical axis and along an axis which passes through the center of the full-fitting register pins at the projection aperture and the camera aperture, respectively.

JOSEPH ARTHUR BALL.

No references cited.